United States Patent

Faulstich

[11] Patent Number: 5,174,699
[45] Date of Patent: Dec. 29, 1992

[54] METHOD FOR FINISHING GEARS VIA SKIVING

[75] Inventor: Ingo Faulstich, Ludwigsburg, Fed. Rep. of Germany

[73] Assignee: Hermann Pfauter GmbH & Co., Ludwigsburg, Fed. Rep. of Germany

[21] Appl. No.: 875,794

[22] Filed: Apr. 28, 1992

Related U.S. Application Data

[63] Continuation-in-part of Ser. No. 525,390, May 17, 1990, abandoned.

[30] Foreign Application Priority Data

May 17, 1989 [DE] Fed. Rep. of Germany ....... 3915976

[51] Int. Cl.⁵ .................................................. B23F 9/00
[52] U.S. Cl. ......................................... 409/26; 51/287; 409/51
[58] Field of Search .................... 409/11, 12, 26, 32, 409/33, 2, 37, 47, 15, 51, 23; 51/105 GG, 287, 95 GH, 52 R; 364/474.02, 474.06

[56] References Cited

U.S. PATENT DOCUMENTS

| | | | |
|---|---|---|---|
| 4,353,671 | 10/1982 | Kotthaus | 409/26 |
| 4,467,568 | 8/1984 | Bloch et al. | 51/287 |
| 4,514,118 | 4/1985 | Kotthaus | 409/26 |
| 4,537,537 | 8/1985 | Becher et al. | 409/26 X |
| 4,555,871 | 12/1985 | Blochel | 409/15 X |
| 4,611,956 | 9/1986 | Kotthaus | 409/26 |
| 4,757,644 | 7/1988 | Erhardt et al. | 409/30 X |
| 4,865,497 | 9/1989 | Faulstich | 409/12 |
| 4,930,950 | 6/1990 | Staptfeld | 409/27 |
| 4,954,027 | 9/1990 | Faulstich | 409/26 |
| 4,961,289 | 10/1990 | Sulzer | 51/105 |
| 4,981,402 | 1/1991 | Krenzer et al. | 409/27 |
| 5,000,632 | 3/1991 | Stadtfeld | 409/26 |
| 5,014,467 | 5/1991 | Luhmer et al. | 51/287 |

FOREIGN PATENT DOCUMENTS

| | | | |
|---|---|---|---|
| 180747 | 5/1986 | European Pat. Off. | 409/12 |
| 58421 | 3/1989 | Japan | 409/32 |
| 499067 | 11/1976 | U.S.S.R. | 409/47 |
| 1000184 | 2/1983 | U.S.S.R. | 409/37 |

Primary Examiner—William Briggs
Attorney, Agent, or Firm—Robert W. Becker & Associates

[57] ABSTRACT

A method for, via skiving, finishing the flanks of the teeth of a cylinder wheel that is provided with internal or external spur or helical gearing is generated. The right and left flanks of the teeth are provided in separate operations and, to produce helix modifications, the center distance, and/or the additional rotation, of the workpiece relative to the tool are altered over the face width of the gear. During axial movement, one or at the same time several of the setting parameters center distance, offset of the tool, swivel angle, and additional rotation are automatically altered in such a way that the distortion of the flanks that would be generated at conventional skiving of crowned gears is compensated for and a tool is used for the finishing that at the right and left flanks has a cutting edge geometry that conforms to the effect on profile of the mean setting parameters that are effective during material removal by the respective cutting edge.

2 Claims, 6 Drawing Sheets

METHOD FOR FINISHING GEARS VIA SKIVING

This is a continuation-in-part application of application Ser. No. 525,390 filed May 17, 1990, abandoned.

BACKGROUND OF THE INVENTION

The present invention relates to a method and apparatus for, via skiving, finishing the flanks of the teeth of a cylinder wheel that is provided with internal or external spur or helical gearing, whereby the right and left flanks of the teeth are generated in separate operations and, to produce helix modifications, such as tooth crowning, and/or end relief, the pertaining apparatus, depending on the movement of the axial carriage, alters the center distance between tool and workpiece, and/or alters the additional rotation of the workpiece relative to the tool.

Skiving is a continuously carried-out process for producing cylindrical gears by cutting. The tool is similar to a gear-type shaping cutter; however, its axis of rotation is crossed with the axis of the workpiece. During machining, the tool and the workpiece carry out a basic rotation In so doing, the speeds of rotation are in inverse ratio to the numbers of teeth of the two elements. Superimposed over the basic rotation, the tool carries out a helical movement relative to the workpiece. This helical movement comprises a displacement of the tool in the direction of the workpiece axis, and an additional rotation of the workpiece that is proportional to this displacement. The additional rotation is calculated in such a way that where a workpiece is being machined without helix modifications, the additional rotation is $2\pi$ if the axial displacement is equal to the lead of the gear toothing to be produced. Thus, the following equations apply $$\frac{\Delta \rho}{2\pi} = \frac{\Delta Z}{H}$$

or $$\Delta Z = \frac{H}{2\pi} \cdot \Delta \rho$$

and $$\Delta \rho = \frac{2\pi}{H} \cdot \Delta Z$$

where $\Delta Z$ = axial carriage displacement
$\Delta \rho$ = angle of additional rotation
$H$ = lead of the workpiece In practice it is frequently desirable rather than forming the flanks of cylindrical teeth exactly as involute helicoids, to modify profile and helix. For example, the gearing should be cut with tooth crowning and profile barrelling. The description of these modifications is conventionally done with the aid of profile- and helix diagrams.

Flank modifications can be produced via skiving. As a first approximation one can say profile modifications are produced via a modification of the tool profile, and helix modifications are produced via a modification of the machine movements.

However, upon closer analysis, it can be seen that the modification of the machine movements also influences the workpiece profile. This influence leads, for example, to the formation of distorted flanks during the skiving of crowned teeth. This distortion means that in different transverse sections, profiles with differing profile slope deviations exist, and on different cylinders helix deviations with different helix slope components exist.

Figure 1A:
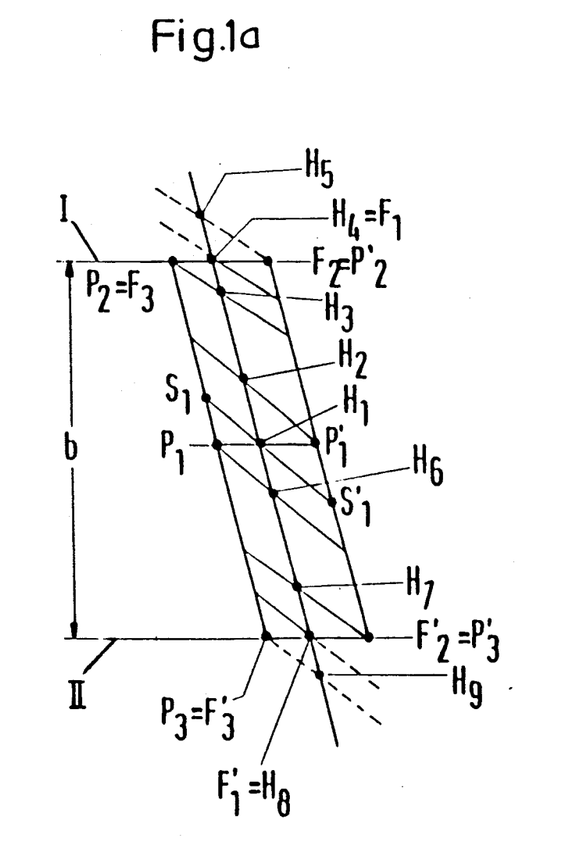
FIGS. 1a and 1b illustrate the right flank of a left-hand helical cylinder gear with the lines on which the profiles or helices are measured, and also illustrate the traces of the tool on the flank (FIG. 1a) as well as helix modification on the reference cylinder (FIG. 1b)
Figure 1B:
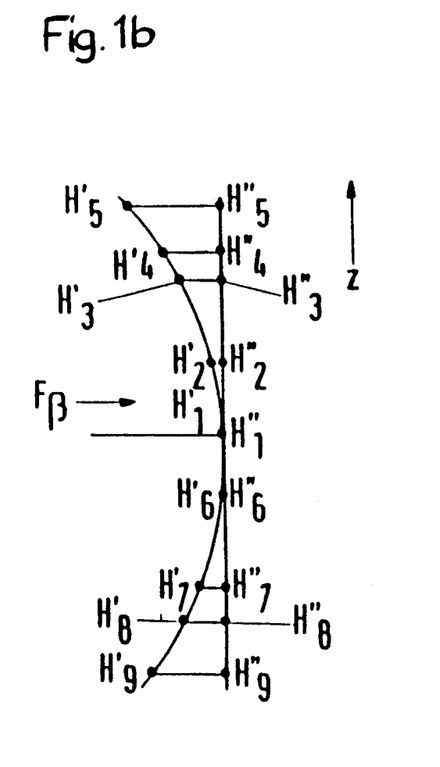

The occurrence of this distortion is explained with the aid of FIGS. 1a and 1b.

FIGS. 1a and 1b show the right flank of a left-hand helical cylinder gear.

The terms are as follows:

b = face width
z = coordinate in direction of the workpiece axis relative to the center of the tooth width
$F_\beta$ = helix deviation (or helix modification)
I = reference face of the gear
II = non-reference face of the gear The term "reference face" is needed to designate the respective flank as the right or left flank. The helix deviation is measured on the measurement cylinder, in FIG. 1a on the line $F_1 F_1'$, and the profile deviation is measured in the center of the tooth width in the transverse section, i.e. the line $P_1 P_1'$. Deviations of the flank from the pertaining unmodified involute helicoid are to be imagined perpendicular to the plane of the drawing.

To facilitate understanding, it should first be assumed that all traces of the tool on a flank have the same course, and all points of a trace are at the same distance from the unmodified involute helicoid, in other words are disposed by the same amount above or below the plane of the drawing. Naturally, when the surface geometry is calculated with the aid of a computer, the simplifications formulated above are not needed.

A course of the helix "deviation" is prescribed in conformity with the representation of FIG. 1b. On the measurement cylinder (FIG. 1a) the high point of the flank is in the center of the face width; in the root area of the toothing, the high point is at $S_1$, and in the tip area at $S_1'$. On each cylinder, between the root-form and tip form cylinder practically the same curve of the helix deviation exists. Merely the high point is shifted in the direction Z in conformity with the z-component of the trace $S_1 S_1'$. Since the length of the $F_\beta$ diagram is always equal to the face width, on various measurement cylinders always a somewhat different region of the prescribed curve will be measured. Therefore, to describe the course of $F_\beta$ in the root area of the toothing the curve is to be extended on face II, and to describe the course in the tip area of the toothing the curve is to be extended on the face I relative to the course on the prescribed measurement cylinder.

The profile deviation in a particular transverse section is the distance of the respectively considered point from the unmodified involute helicoid. In conformity with the aforementioned statements, one obtains, for example, the profile deviation in the middle of the face width at the locations $P_1$ (root form circle) or $P_1'$ (tip form circle) as the distance of the traces that extend through these points from the unmodified involute helicoid. $P_1$ consequently has the same distance as point $H_6$ from the unmodified involute helicoid, namely the distance $H_6'H_6''$; similarly, $P_1'$ has the distance $H_2'H_2''$. If this procedure is carried out for further points between $P_1$ and $P_1'$, one sees that the course of the profile deviation $F_\alpha$ in the middle of the face width is the same as the course of the helix deviation $F_\beta$ between $H_6'$ over $H_1'$ to $H_2'$.

If the previously formulated considerations relative to the helix deviations on the root-form or the tip form cylinder and relative to the profile deviations in planes I and II are applied, the following results will be obtained:

| Measured parameter | Measuring plane of cyliner | Measurement between the points | Course of the deviation |
|---|---|---|---|
| $F_\alpha$ | I | $P_2-P_2'$ | $H_3'-H_4'-H_5'$ |
| | Middle of the face width | $P_1-P_1'$ | $H_6'-H_1'-H_2'$ |
| | II | $P_3-P_3'$ | $H_9'-H_8'-H_7'$ |
| $F_\beta$ | Root form cylinder | $F_3-F_3'$ | $H_3'-H_9'$ |
| | Prescribed measuring cylinder | $F_1-F_1'$ | $H_4'-h_8'$ |
| | Tip form cylinder | $F_2-F_2'$ | $H_5'-H_7'$ |

If the results are plotted graphically, the illustrations of FIGS. 2a-2f are obtained. In these illustrations, the deviation existing at the respective point is designated by the symbol "q", i.e.

$$q_1 = H_1' \, H_1'' = 0$$

$$q_2 = H_2' \, H_2''$$

$$q_3 = H_3' \, H_3''$$

Figure 2A:
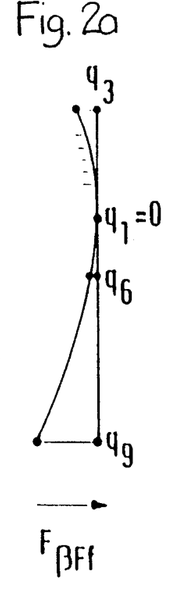
FIGS. 2a-2f show helix modifications on different measurement cylinders (FIGS. 2a-2c) and profile modifications in different transverse sections (FIGS. 2d-2f)
Figure 2B:
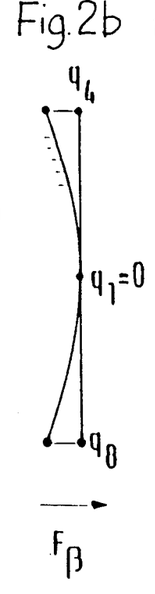
Figure 2C:
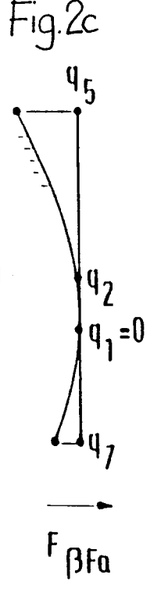
Figure 2D:
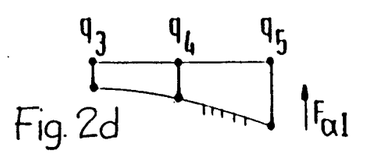
Figure 2E:
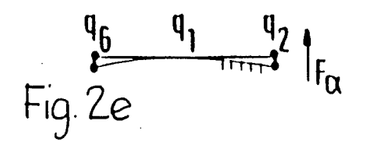
Figure 2F:
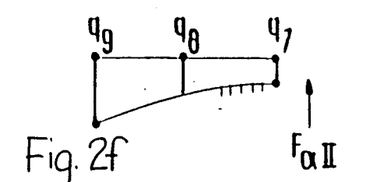
Figures 3A, 3B:
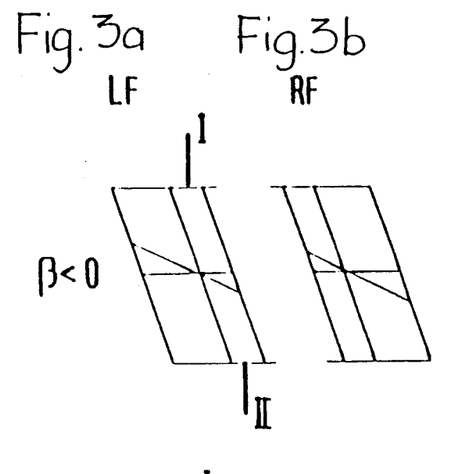
FIGS. 3a-3h show right and left flanks of spur and helical gearing of cylinder wheels along with the lines on which profiles or helices are measured, as well as the traces of the tool.
Figure 3C:
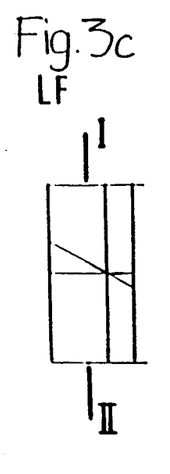
Figure 3D:
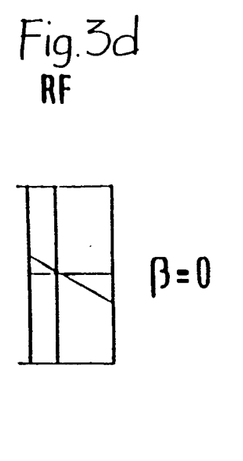
Figures 3E, 3F:
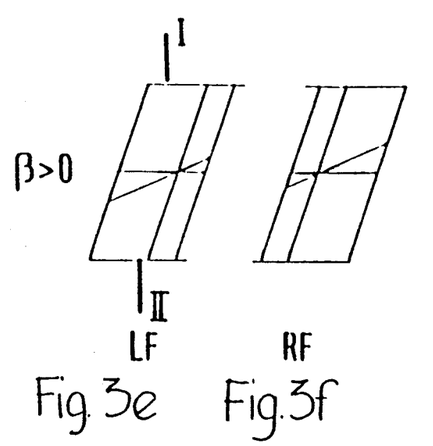
Figure 3G:
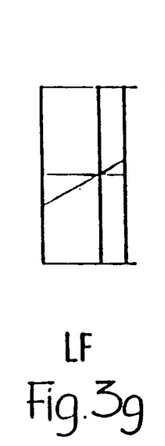
Figure 3H:
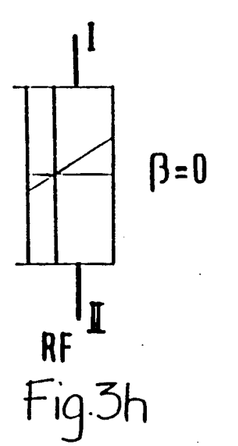

Furthermore, $F_{\beta Ff}$ designates the helix deviations on the root form cylinder, and $F_{\beta Fa}$ designates the helix deviations on the tip form cylinder.

With the exception of the points on the trace $S_1S_1'$, all of the points of the modified flank are recessed from an unmodified involute helicoid; the values $q_2 \ldots q_9$ therefore have a negative sign.

If the helix slope deviation on the root form cylinder is designated with the symbol $f_{H\beta f}$, and the deviation on the tip form cylinder is designated with the symbol $f_{H\beta a}$, the following equations are obtained $$f_{H\beta f} = -q_9$$

$$f_{H\beta a} = q_5 - q_7$$

The distortion of the helices is $$\Delta f_{H\beta} = f_{H\beta a} - f_{H\beta f}.$$

From the profile slope deviations $$f_{HaI} = q_5 - q_3$$

in plane I, and $$f_{HaII} = q_7 - q_9$$

in plane II, the distortion of the profiles is $$\Delta f_{Ha} = f_{HaI} - f_{HaII}$$

It should be noted that in this example $\Delta f_{H\beta}$ and $\Delta f_{Ha}$ have a negative sign. This can be easily seen from the values illustrated in FIGS. 1a, 1b and 2a-2f.

The previously mentioned statements relate to the right flanks of a left-hand helical toothing. The observations can be easily transferred to the remaining situations, in other words to the left flanks of the left-hand helical toothing and to the two flanks of a right-hand helical toothing or a spur toothing. For this purpose, it is merely necessary to have the course of the tool trace on the respective workpiece flank.

The trace can be calculated together with the tool design or with the simulation of the finishing process. Also in the remaining situations, i.e. in particular with a spur toothing, the trace extends obliquely over the workpiece flank. FIGS. 3a-3h shows in principle the courses of the traces for the aforementioned situations.

With skiving, a spur toothing can be machined only with a helically toothed tool. The sign of the "inclination" of the traces depends in this connection upon the sign of the helix of the tool. Consequently, with spur toothed workpieces the two outlined curves for the traces result.

Whereas with the right flank of the left-hand helical toothing the points of the trace in the tip area of the workpiece toothing are closer to the plane II than in the root area, these points of the left flank of the left-hand helical toothing are closer to the plane I. When using the previously described calculation process, one discovers that the distortion of the helices and the distortion of the profiles of the left flanks of the left-hand helical toothing have a positive sign. It has already been mentioned that corresponding values of the right flanks have a negative sign. It is also true in the remaining situations that the profiles and of the helices has an opposite sign on the right flank compared with the respective sign of the distortion of these values on the left flank.

The distortion of the flanks of cylinder wheels that are finished via skiving, as characterized by the distortions of profile and helix, is frequently undesired. It is therefore an object of the present invention to further develop the method and apparatus of the aforementioned type in such a way that the distortion of the flanks is brought to a desired value, and possibly is avoided or at least is reduced to a negligibly small value.

SUMMARY OF THE INVENTION

This object is realized by a method for, via skiving, finishing with a toothed skiving cutter-tool carried on an axial carriage the flanks of the teeth of a cylinder wheel workpiece that is provided with internal or external spur or helical gearing, wherein the right and left flanks of the teeth are generated in separate operations and wherein said workpiece and said tool perform two motions, namely a basic rotation, at which the ratio of the rotational speeds of said workpiece and said tool is equal to the inverse ratio of the respective numbers of the teeth of said workpiece and said tool, and a helical movement, which consists of a displacement of said tool in the direction of the axis of said workpiece and an additional rotation of said workpiece proportional to said displacement and, to produce conventional helix modifications, such as tooth crowning, and/or end relief, the pertaining apparatus, depending on the movement of said axial carriage thereof, alters the center distance between said tool and said workpiece, and/or alters said additional rotation of said workpiece relative to said tool. A first alternative of this method is characterized primarily by the steps of, during said axial movement, automatically altering relative to said conventionally performed alteration at the same time one of swivel angle, swivel angle and center distance, offset of said tool and center distance, and swivel angle and offset of said tool and center distance to generate a profile slope deviation depending on the respective transverse plane. A second alternative of this method is characterized primarily by the steps of: during said axial movement, automatically altering relative to said conventionally performed alterations at the same time one of swivel angle, offset of said tool, center distance, and a combination of said setting parameters to generate a profile slope deviation depending on the respective transverse plane; automatically altering at the same time at least one of additional rotation and center distance to compensate for the effect of said measures on the desired helix modification and iteratively determining quantitatively the required alterations to simultaneously achieve a desired distortion of the flanks and the desired helix modification; and using a tool for the finishing that is designed in such a way that the profile in a profile reference section compensates for the profile deviation that has to be expected according to the setting conditions that are effective when generating the profile in this area.

With the inventive method pursuant to the aforementioned two alternatives, it is possible to bring the distortion of the flanks to a desired value, and possibly to avoid this distortion or to limit it to a negligibly small value. If, for example, a helically geared tool is used with the first alternative method and is operated without offset, i.e. the offset "e" is 0, then the desired distortion at the flanks can be generated in a straightforward manner via a dynamic alteration of the swivel angle $\Sigma(z)$. The necessary alteration of the swivel angle $\Sigma(z)$, in other words during movement of the axial carriage, can be easily determined by simulating the finishing process on a computer.

If one works with the same tool, but with an offset "e" of the tool (e≠0), then, if the previously described embodiment was utilized, a helix deviation would result at the workpiece flanks. This can be avoided by an appropriate alteration of the center distance "a" and/or the additional rotation $\Delta \rho$ as a function of the axial carriage position. This measure also makes it necessary to appropriately modify the swivel angle $\Sigma(z)$.

Similarly, a desired distortion of the workpiece flanks can be generated by an appropriate dynamic alteration of the offset "e"(z). The helix deviation that thereby results can, as already described in connection with the swivel angle alteration $\Sigma(z)$, be appropriately compensated for by an alteration of the center distance "a"(z) and/or the additional rotation $\Delta \rho(z)$. Of course, with this correction the offset "e"(z) must be appropriately adapted.

It is to be understood that any combination of the aforementioned parameter alterations is possible in order to generate the desired tooth flank distortion.

Figure 4:
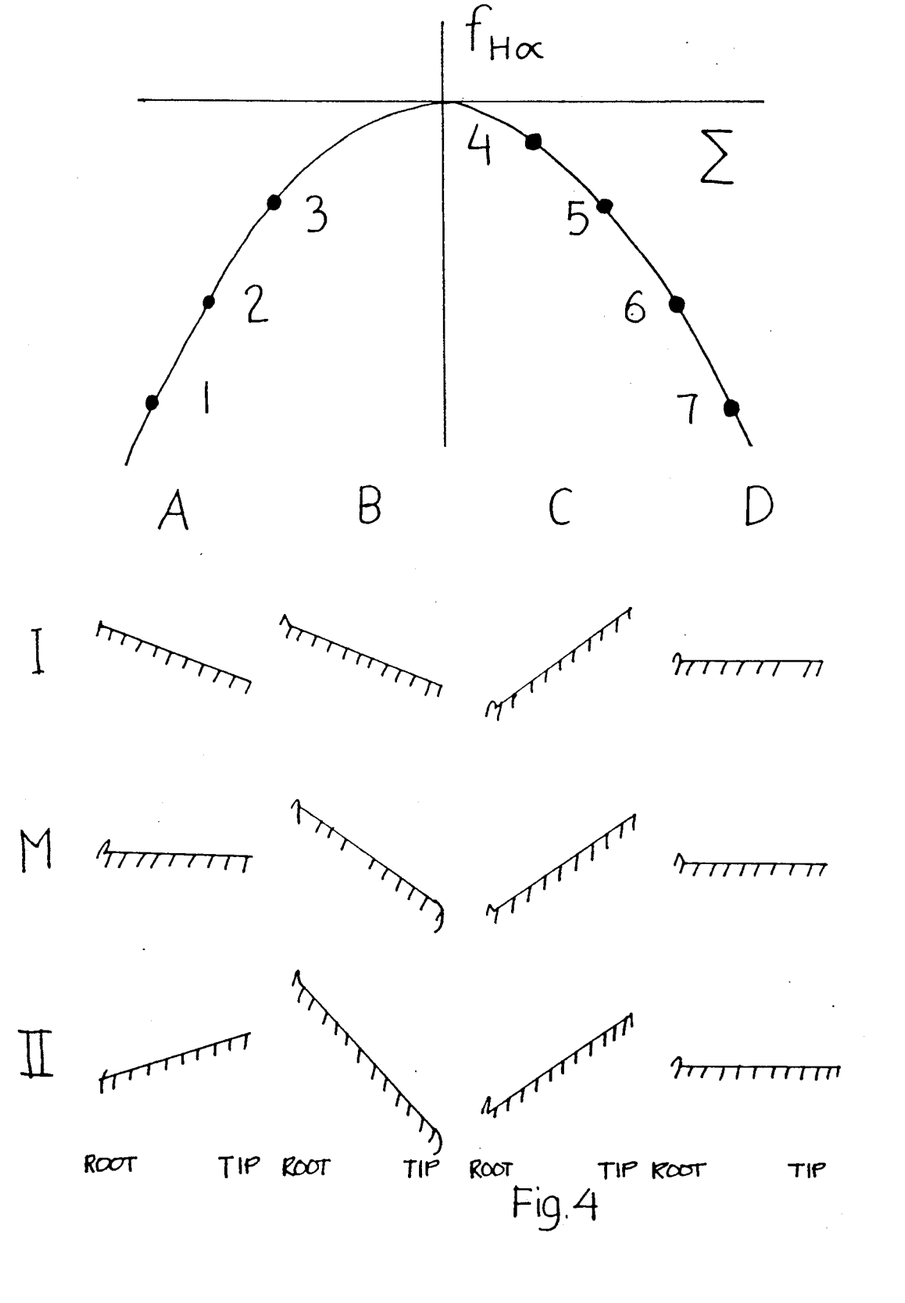
FIG. 4 shows the profile slope deviation $f_{H\alpha}$ plotted versus the swivel angle $\Sigma$ for one example and profile slope deviations in planes I, M and II; the columns refer to components of the profile slope deviations, generated.

The second alternative method is particularly applicable to tools with spur gearing. With such tools, an alteration of the swivel angle $\Sigma$ (z) in the range of the customarily utilized value has no success. Rather, it is necessary to shift the range of variation of the swivel angle. The average swivel angle must be increased when finishing one flank and must be correspondingly reduced when finishing the other flank. The necessary dynamic swivel angle alteration for generating the desired distortion of the flanks is then carried out about this average swivel angle position. This is briefly explained in conjunction with FIG. 4. The profile slope deviation $f_{H\alpha}$ is plotted versus the swivel angle $\Sigma$ for one exemplary embodiment in FIG. 4. Looking again, as in FIGS. 1a-1b and 2a-2f, at the right flank of a left-hand helical workpiece, then with the heretofore known method one would obtain the previously described negative distortion of the flank, characterized for example by the profile slope deviations in the transverse sections I, M transverse section in the center of the tooth width) and II in conformity with column A in the bottom half of FIG. 4. If during the finishing the swivel angle is now altered in conformity with the values in the upper portion of FIG. 4 from point 5 through point 6 to point 7, then obtained as superimposed portions are profile slope deviations in conformity with column B. If one now additionally utilizes a tool that when applying the known method generates a profile slope deviation in conformity with column C in all transverse sections, i.e. also in the three that are illustrated, then one obtains, as a superimposition of the effects shown in columns A, B and C, the desired result in conformity with column D.

There is also a relationship between the profile slope deviation $f_{H\alpha}$ and the offset "e", and a relationship between the profile slope deviation $f_{H\alpha}$ and the center distance "a" also exists. These relationships can also be used in an analagous manner to generate a desired distortion of the tooth flanks.

There are applications where when the second alternative method is used helix deviations result that are too great. These can be compensated for by an appropriate alteration of the additional rotation $\Delta \rho(z)$ and/or the center distance "a"(z). These alterations involve dynamic alterations relative to the modification utilized with the conventional method.

With the inventively proposed approach, an additional advantage is obtained due to the fact that in many cases a truly cylindrical tool, i.e. a without design clearance angle, can be utilized.

$\beta <0$ refers to a left hand helix gear $\beta =0$ refers to a spur gear $\beta >0$ refers to a right hand helix gear.

A at conventional skiving

B at introducing an additional dynamic alteration $\Sigma$ (Z)

C at using a cutter with a modified profile

D contains the superimposition of the effects shown in A, B and C.

Figure 5:
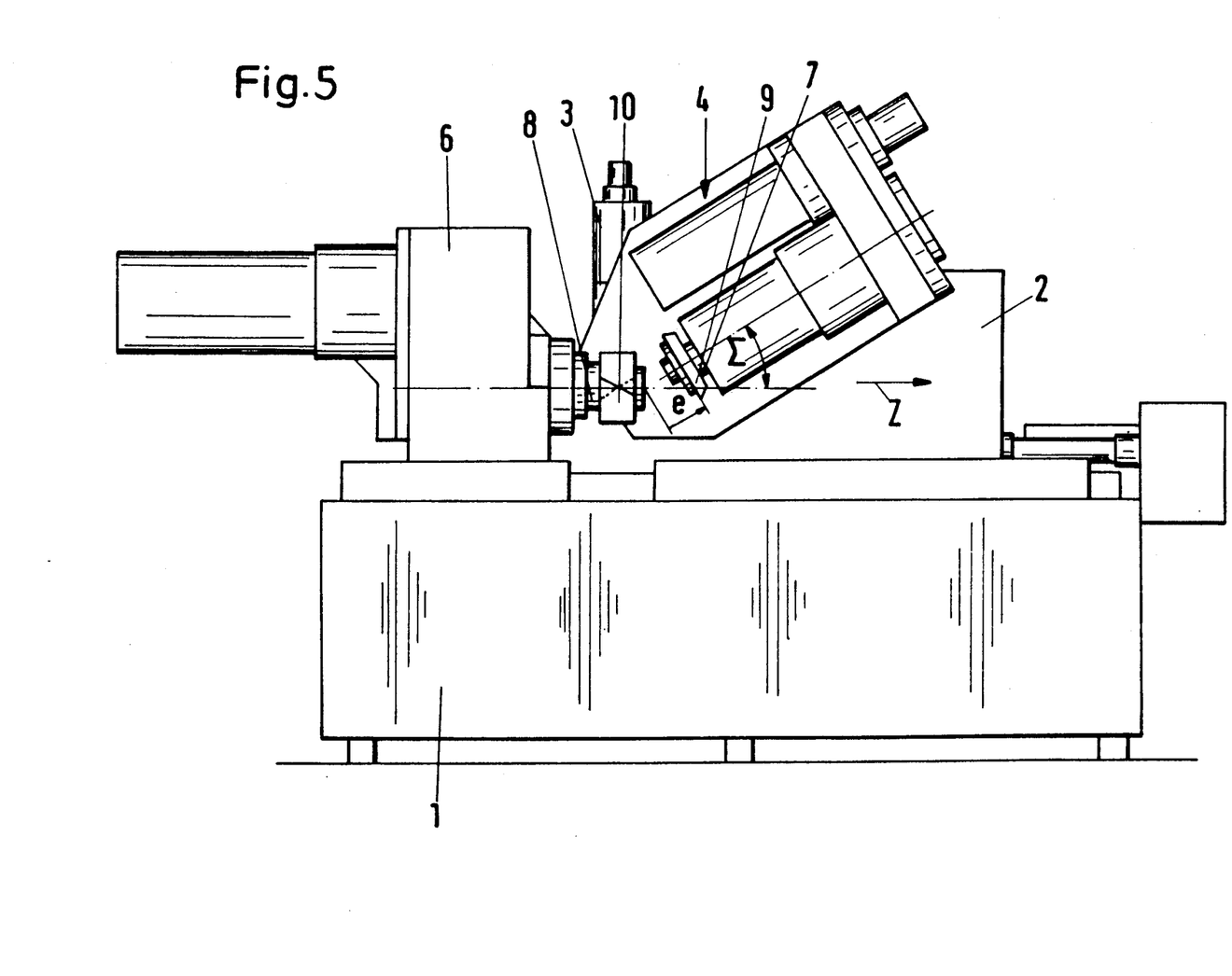
FIG. 5 is a side view of one exemplary embodiment of the inventive apparatus for carrying out the method of the present invention.
Figure 6:
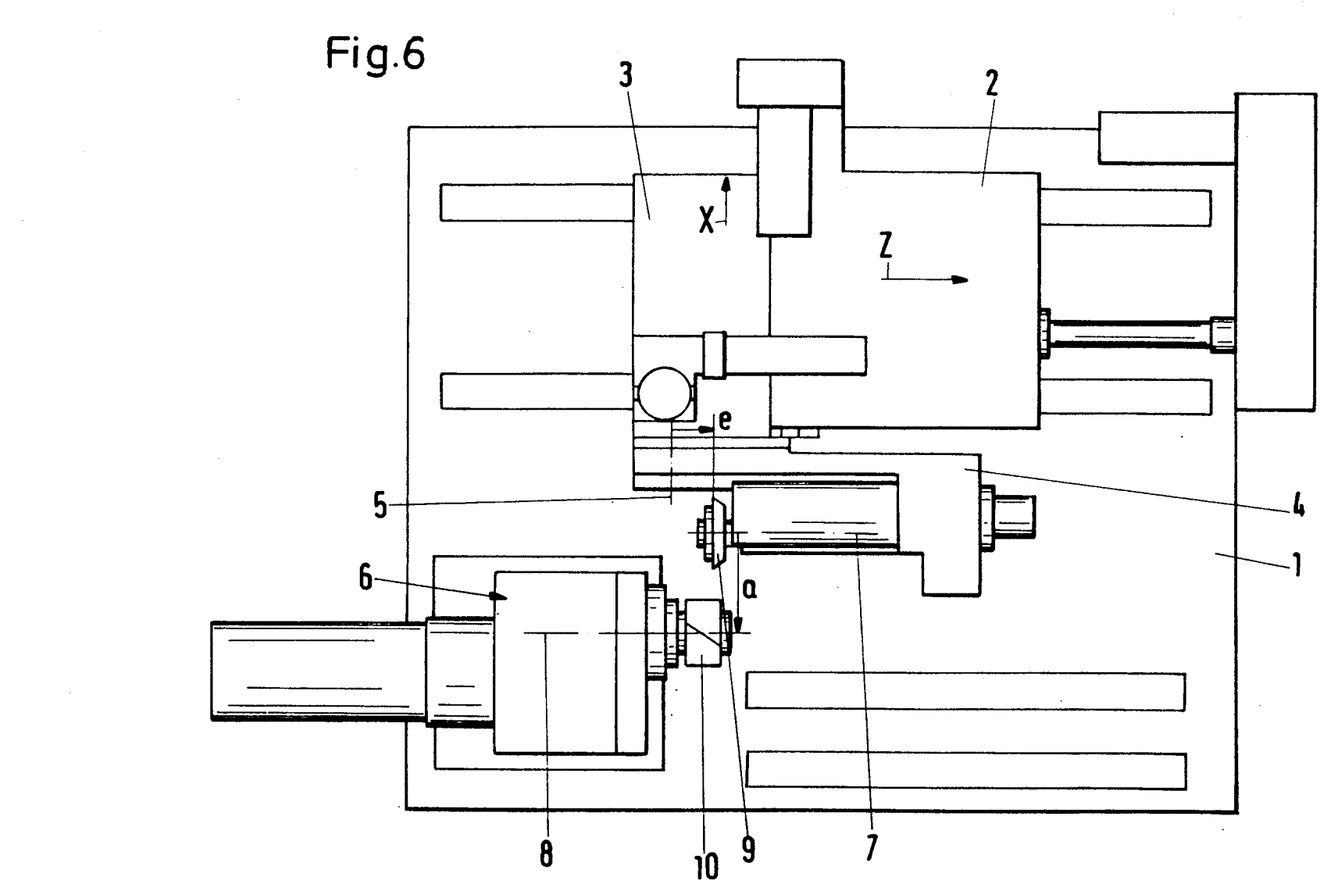
FIG. 6 is a top view of the apparatus of FIG. 5.

FIGS. 5 and 6 illustrate the skiving machine that is provided for carrying out the inventive method. This machine has a bed 1 on which the axial carriage 2 can be moved in the z-direction. The axial carriage carries a radial carriage 3 that can be moved in the x-direction relative to the axial carriage 2. Pivotably disposed on the radial carriage 3 is a skiving head 4, which is pivotable about the axis 5. A workpiece spindle unit 6 is fixedly secured to the bed 1. The skiving head 4 and the workpiece spindle unit 6 each have a spindle 7 or 8 for receiving a tool 9 and a workpiece 10 respectively.

During machining of the workpiece 10, the tool 9 and the workpiece 10 carry out a basic rotation in a known manner. In this connection, they rotate in an inverse ratio to their respective numbers of teeth. During one rotation of the workpiece during the machining process, a narrow band of the final workpiece toothing results. A helical movement is required to form the toothing on the workpiece 10 over the entire width. This helical movement comes about by moving the axial carriage 2 in the z-direction while the workpiece 10 at the same time carries out an additional rotation. During the machining or finishing process, the axes of the tool 9 and the workpiece 10 are disposed in a known manner at an angle $\Sigma$ relative to one another.

This swivel angle $\Sigma$ can be dymanically altered during the finishing process. The spindle 7 that carries the tool 9 can be axially shifted in a known manner to alter the offset "e".

The present invention is, of course, in no way restricted to the specific disclosure of the specification and drawings, but also encompasses any modifications within the scope of the appended claims.

What I claim is:

1. In a method for, via skiving, finishing with a toothed skiving cutter-tool carried on an axial carriage the flanks of the teeth of a cylinder wheel workpiece that is provided with internal or external spur or helical gearing, wherein the right and left flanks of the teeth are generated in separate operations and wherein said workpiece and said tool perform two motions, namely a basic rotation, at which the ratio of the rotational speeds of said workpiece and said tool is equal to the inverse ratio of the respective numbers of the teeth of said workpiece and said tool, and a helical movement, which consists of a displacement of said tool in the direction of the axis of said workpiece and an additional rotation of said workpiece proportional to said displacement and, to produce conventional helix modifications, such as tooth crowning, and/or end relief, the pertaining apparatus, depending on the movement of said axial carriage thereof, alters the center distance between said tool and said workpiece, and/or alters said additional rotation of said workpiece relative to said tool, the improvement including the step of:

during said axial movement, automatically altering relative to said conventionally performed alteration at the same time one of swivel angle, swivel angle and center distance, offset of said tool and center distance, and swivel angle and offset of said tool and center distance to generate a profile slope deviation depending on the respective transverse plane.

2. In a method for, via skiving, finishing with a toothed skiving cutter-tool carried on an axial carriage the flanks of the teeth of a cylinder wheel workpiece that is provided with internal or external spur or helical gearing, wherein the right and left flanks of the teeth are generated in separate operations and wherein said workpiece and said tool perform two motions, namely a basic rotation, at which the ratio of the rotational speeds of said workpiece and said tool is equal to the inverse ratio of the respective numbers of the teeth of said workpiece and said tool, and a helical movement, which consists of a displacement of said tool in the direction of the axis of said workpiece and an additional rotation of said workpiece proportional to said displacement and, to produce conventional helix modifications, such as tooth crowning, and/or end relief, the pertaining apparatus, depending on the movement of said axial carriage thereof, alters the center distance between said tool and said workpiece, and/or alters said additional rotation of said workpiece relative to said tool, the improvement including the steps of:

during said axial movement, automatically altering relative to said conventionally performed alterations at the same time one of swivel angle, offset of said tool, center distance, and a combination of said setting parameters to generate a profile slope deviation depending on the respective transverse plane;

automatically altering at the same time at least one of additional rotation and center distance to compensate for the effect of said measures on the desired helix modification and iteratively determining quantitatively the required alterations to simultaneously achieve a desired distortion of the flanks and the desired helix modification; and using a tool for the finishing that is designed in such a way that the profile in a profile reference section compensates for the profile deviation that has to be expected according to the setting conditions that are effective when generating the profile in this area.

* * * * *